United States Patent [19]
Woods

[11] Patent Number: 5,326,494
[45] Date of Patent: Jul. 5, 1994

[54] LIQUID PERSALT BLEACH COMPOSITIONS CONTAINING TARTRAZINE AS THE STABILIZER

[75] Inventor: William G. Woods, Riverside, Calif.

[73] Assignee: U.S. Borax Inc., Valencia, Calif.

[21] Appl. No.: 953,909

[22] Filed: Sep. 30, 1992

Related U.S. Application Data

[62] Division of Ser. No. 609,272, Nov. 5, 1990, Pat. No. 5,180,517.

[51] Int. Cl.$^5$ ............................................ C01B 15/037
[52] U.S. Cl. ............................ 252/186.27; 252/186.3; 252/186.31; 252/95
[58] Field of Search ............ 252/186.27, 186.3, 186.31

[56] References Cited

U.S. PATENT DOCUMENTS

| | | | |
|---|---|---|---|
| 2,012,462 | 9/1935 | Agthe et al. | 23/251 |
| 3,234,140 | 2/1966 | Irani | 252/186.25 |
| 3,553,140 | 1/1991 | Lindner et al. | 252/99 |
| 3,956,159 | 5/1976 | Jones | 252/104 |
| 3,970,575 | 7/1976 | Barrett, Jr. | 252/95 |
| 3,996,151 | 12/1976 | Kirner | 252/186.25 |
| 4,115,060 | 9/1978 | Finley et al. | 8/111 |
| 4,180,467 | 12/1979 | Barth | 252/99 |
| 4,238,192 | 12/1980 | Kandathil | 8/111 |
| 4,275,031 | 6/1981 | Fisher et al. | 422/57 |
| 4,430,236 | 2/1984 | Franks | 252/95 |
| 4,477,390 | 10/1984 | Ledent et al. | 260/502.5 E |
| 4,891,147 | 1/1990 | Gray et al. | 252/104 |
| 4,900,468 | 2/1990 | Mitchell et al. | 252/95 |
| 4,900,469 | 2/1990 | Farr et al. | 252/96 |
| 5,059,344 | 10/1991 | Aoyagi et al. | 252/186.38 |
| 5,102,571 | 4/1992 | Mole et al. | 252/99 |
| 5,160,655 | 11/1992 | Donker et al. | 252/95 |
| 5,180,514 | 1/1993 | Farr et al. | 252/99 |

FOREIGN PATENT DOCUMENTS

| | | |
|---|---|---|
| 209228 | 1/1987 | European Pat. Off. . |
| 349153 | 1/1990 | European Pat. Off. . |
| 2001793 | 1/1987 | Japan . |

Primary Examiner—Richard D. Lovering
Assistant Examiner—Joseph D. Anthony
Attorney, Agent, or Firm—James R. Thornton

[57] ABSTRACT

Stable, concentrated aqueous persalt solutions are provided in which the stabilizing agent is an arylazo compound, such as tartrazine, having an ortho-hydroxy substituent on the aryl group. Preferred compositions contain sodium perborate and a solubilizing agent as well as the azo stabilizer.

11 Claims, No Drawings

LIQUID PERSALT BLEACH COMPOSITIONS CONTAINING TARTRAZINE AS THE STABILIZER

This is a continuation of copending application Ser. No. 07/609,272 filed on Nov. 5, 1990 now U.S. Pat. No. 5,180,517.

This invention relates to the stabilization of aqueous persalt bleach solutions, especially solutions containing active oxygen derived from sodium perborate or sodium percarbonate.

RELATED APPLICATIONS

Copending application Ser. No. 07/473,508 filed Feb. 1, 1990 by William G. Woods and assigned to the assignee of this application, is directed to stabilization of peroxygen solutions by a class of substituted phenylarylamine sulfonates.

BACKGROUND OF THE INVENTION

Liquid laundry products such as liquid detergents and liquid bleach formulations have become increasingly popular in the last few years. However, aqueous liquid detergent formulations currently available do not contain a persalt bleach system such as is found in powdered detergents based on sodium perborate because of poor storage stability of the peroxide in the aqueous media. Although sodium perborate has been popular as a bleaching agent for powdered detergent formulations for many years in Europe, it has only recently found acceptance in the United States as a bleach for powdered detergents. There is a need, therefore, for stable, concentrated water-based persalt bleaching compositions which have a shelf life adequate to provide sufficient oxidizing peroxygen bleach in a commercial product. Such concentrated solutions are necessary so that a liquid laundry bleach, when diluted in the washing medium, will provide a concentration of active oxygen sufficient to provide adequate bleaching.

The solubility of sodium perborate in water at 20° C. is 2.25% (corresponding to 0.23% active oxygen); however, it is known that the perborate solubility can be increased by use of solubilizing agents such as the alkali metal phosphates, boric acid, tartaric and citric acids as well as mineral acids, such as sulfuric acid and phosphoric acid. Although the perborate content can be increased by use of such cosolutes, the problem of adequate shelf stability remains of concern.

It has been proposed that the addition of a chelating agent or sequestrant can enhance the stability of sodium perborate in aqueous formulations by removing catalytic metal ions. Examples of such chelating agents or sequestrants include salts of ethylenediamine tetraacetic acid and complex organo-phosphates, such as the alkali metal salts of amino methylenephosphonic acid as disclosed in U.S. Pat. Nos. 3,234,140 and 4,477,390. The pentasodium salt of diethylenetriamine penta(methylene phosphonic) acid, which is available as DEQUEST ® 2066 from Monsanto Chemical Co., is an example of such complex organo-phosphates.

Other stabilizer systems for peroxy solutions are inorganic salts of polybasic acids such as potassium polyphosphates, described in U.S. Pat. No. 3,553,140, quaternary ammonium salts described in U.S. Pat. No. 3,996,151, and picolinic or quinaldic acid which are described as stabilizers for organo peroxyacid bleach compositions in U.S. Pat. No. 3,956,159.

Recent patents and published applications disclose stabilization of hydrogen peroxide bleach compositions. See, for example U.S. Pat. No. 4,900,468 and PCT Application 0 209 228 which relate to use of substituted phenols as stabilizers. Also see PCT Application 0 349 153 which describes use of a stabilizing system comprising a heavy metal chelating agent and an aromatic amine free radical scavenging agent for hydrogen peroxide compositions. U.S. Pat. No. 4,900,469 discloses a hydrogen peroxide bleach solution stabilized with a chelating agent and an antioxidant. U.S. Pat. No. 4,238,192 describes a hydrogen peroxide bleach composition containing an alpha-amino acid as a stabilizer. The compositions may also contain a small amount of dye or optical brightener. U.S. Pat. No. 3,970,575 claims a liquid hydrogen peroxide composition containing a phthalocyanine blue dye pigment. U.S. Pat. No. 4,430,236 discloses use of an anthroquinone blue dye in hydrogen peroxide. U.S. Pat. No. 2,012,462 discloses stabilization of peroxide solutions by use of a mixture of a salt of pyrophosphoric acid and an aromatic amine sulphonate in which the amino nitrogen may be substituted with an alkyl or aralkyl group.

Hydrogen peroxide solutions are generally quite acidic, having a pH in the range of about 1 to 4. This results in a more acidic washing solution, which can be a hazard to the user, as well as reducing detergency. The persalt solutions of this invention have a more neutral pH, which is desirable from the standpoint of safety and efficacy.

DESCRIPTION OF THE INVENTION

This invention provides concentrated, stable aqueous persalt containing bleaching compositions containing a specific class of stabilizers. Accordingly, this invention comprises a stable, concentrated aqueous persalt solution comprising about 5 to 30% sodium perborate or sodium percarbonate, about 3 to 30% solubilizing agent, and about 0.001 to 1.0% of an azo stabilizing agent of the formula

in which Ar is selected from phenyl, naphthyl, and the substituted phenyl and naphthyl groups and R is selected from Ar and unsaturated heterocyclic groups containing carbon and nitrogen. The substituents can be, for example, one or more nitro, amino, sulfonic acid (and salts), halo, lower alkyl, phenylazo, hydroxy, lower alkoxy, carboxylic acid (and salts), ureamido, sulfamido, acetamido, acyl groups, alkylene chains which may contain one or more nitrogen atoms, or combinations thereof. It is essential that one aromatic group contain a hydroxy substituent ortho to the azo linkage. The balance of the formulation is water, although other functional ingredients can be included to provide desirable properties or functions in the composition, such as for example, surfactants, builders, fragrances, activators, chelating agents, optical brighteners, etc.

The persalt component of the formulation is preferably sodium percarbonate or sodium perborate. The sodium perborate can be added as the monohydrate or tetrahydrate or formed in situ by addition of hydrogen peroxide, boric acid or borax, and sodium hydroxide. The aqueous formulations of this invention contain about 5 to 30% sodium perborate or sodium percarbonate (ignoring the water of hydration) and preferably contain from about 8 to about 25% of the perborate or percarbonate.

In order to increase the solubility of the perborate or the percarbonate in the aqueous formulation, a solubilizing agent is included. Such solubilizing agents can be alkali metal phosphates such as sodium phosphates, organic acids such as citric and tartaric acids, and inorganic acids such as boric acid, phosphoric acid or sulfuric acid. The acids may also be added as the water soluble salts thereof. The preferred solubilizing agents are the alkali metal phosphates, especially sodium dihydrogen phosphate and disodium monohydrogen phosphate, phosphoric acid and mixtures thereof.

In order to obtain a concentrated solution of the perborate or percarbonate, the solubilizing agent should be present in an amount of from about 2 to 30% by weight. Preferably, when sodium dihydrogen phosphate or disodium hydrogen phosphate are used as the solubilizing agent, from about 5 to 20% by weight is included in the solution. When boric acid, citric acid and tartaric acid are used, they are present in the range of from about 15 to 25% by weight of the formulation. Sulfuric acid and phosphoric acid can be used as cosolutes in an amount corresponding to about 2 to 10% $H_2SO_4$ or $H_3PO_4$ in the formulation.

A chelating or sequestering agent may also be included, but is not essential. Suitable chelating agents are the well known sequestrants, ethylenediamine tetraacetic acid (sodium salt) and trisodium nitrilotriacetate (NTA). The preferred chelating agents are the complex organo aminophosphonic acid derivatives such as described in U.S. Pat. Nos. 3,234,140 and 4,477,390. A preferred agent is the pentasodium salt of diethylenetriamine penta(methylene phosphonic acid) which is sold as DEQUEST ® 2066 (25% active on free acid basis). The formulations of this invention can contain up to about 5% by weight of the chelating agent.

The components of the compositions of this invention are dissolved in water, which may be either deionized water or tap water, deionized water being preferred. The formulations are prepared by merely dissolving the components in water (deionized or tap water) which has been heated slightly, such as to about 40° C. The order of addition is not critical, although it appears that there may be some advantages in the sequential, stepwise addition of solubilizing agent followed by perborate. The resultant solution is stirred until all the components are dissolved or nearly dissolved. It has been noted that some of the stabilizing agents have limited water solubility and, as a result, a slight turbidity or color of the formulated solution may be observed. However, this slight turbidity or color does not detract from the utility of the formulation as a source for active oxygen in laundry solutions.

The azo stabilizers are added to the compositions in an amount corresponding to about 0.001 to 1.0%, with about 0.005 to 0.05% being preferred.

As pointed out above, the azo stabilizing agents of the formulations of this invention comprise the compounds of the formula;

ortho—HO—Ar—N=N—R in which Ar is selected from phenyl, naphthyl, and the substituted phenyl and naphthyl groups, and R is selected from Ar and unsaturated heterocyclic groups containing carbon and nitrogen, which may also be substituted.

The compounds may also be represented by the formulae:

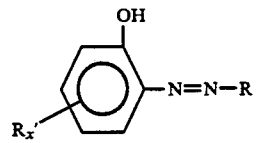

and

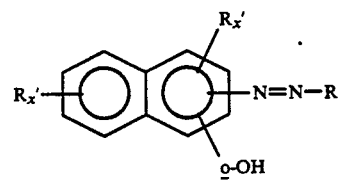

in which R is selected from phenyl, naphthyl, substituted phenyl, substituted naphthyl, or unsaturated heterocyclic groups containing carbon and nitrogen, R' is the substituent(s) on the aromatic ring, and x is 0 to about 5, preferably 1-3. Representative examples of substituents represented by R' are nitro, amino, lower alkoxy, hydroxy, lower alkyl, halo (such as bromo and chloro), sulfonic acid (and salts), phenylazo, carboxylic acid (and salts), ureamido, sulfamido, acetamido, acyl, alkylene and heterocylic linkages which contain one or more nitrogen atoms. The phenyl, naphthyl and heterocyclic groups represented by R may also have the substituents defined above for R'.

Preferred compounds are those in which R' is one or more amino, nitro, lower alkyl, hydroxy, and/or alkali metal sulfonate groups, or combinations thereof. Such preferred compounds also include hydroxy, lower alkyl, nitro, amino and/or alkali metal sulfonate-substituted phenyl, naphthyl, and heterocyclic groups represented by R. For long term stability, compounds having nitro substituents on the aromatic ring, such as Eriochrome Black T, are most preferred.

In a further embodiment of this invention, tartrazine, having the formula

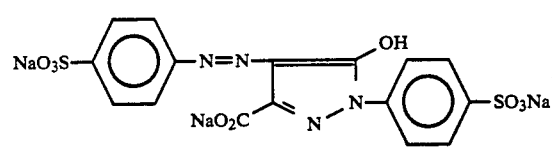

is also an effective stabilizer.

Many of the azo stabilizer compounds are commercially available as dyes. For example, the most preferred compounds are the dyes, Mordant Brown 1, 4, 6, 24, 33, and 48, Calmagite, Palatine Chrome Black, Chicago Sky Blue, Acid Alizarin Violet N, Acid Red 1, Eriochrome Black T, Calcon, Eriochrome Blue Black B, Magon, and Chromotrope 2R. See the Aldrich Catalog of Fine Chemicals for the molecular structures and Color Index numbers of the dyes. They can be prepared by known reactions for producing azo dyes such by as diazotization and coupling a primary aromatic amine compound with the corresponding reactive aromatic compound such as a phenol or naphthol. See Kirk-Othmer, "Encyclopedia of Chemical Technology", 3rd Edition, Vol. 8, pages 201-203 (1979) and Fieset and Fieser, "Organic Chemistry, 3rd Edition, pages 922-932 (1956) for reviews of azo dyes and their chemistry.

The stabilizers must have some water solubility; at the neutral pH of the preferred formulations of this invention (pH 5-8), the stabilizers may form water-soluble alkali metal salts in situ.

The following examples illustrate persalt compositions containing the stabilizing agents of this invention.

EXAMPLE I

Five solutions were prepared by dissolving 33.33 g. of sodium perborate tetrahydrate and 33.33 g. of sodium dihydrogen phosphate monohydrate in 100 g. of tap water (corresponding to 10.63% $NaBO_3$ and 17.39% $NaH_2PO_4$). Erichrome Black (Color Index 14645) (80% dye) was added in the amounts of 0, 0.0017, 0.0084, 0.017 and 0.084 grams to give final solutions containing 0 to 500 ppm of the stabilizing agent. The solutions were kept in a constant temperature bath at 45° C. and samples removed after 14 days for titration with 0.1N $KMnO_4$ solution to determine the active oxygen content. The active oxygen lost as a percentage of the initial value was then calculated. The results are shown in Table I.

TABLE I

| Percent Active Oxygen Lost | |
|---|---|
| Stabilizer ppm | Percent |
| 0 | 35-45 |
| 10 | 16.6 |
| 50 | 8.5 |
| 100 | 5.3 |
| 500 | 5.1 |

It is seen that excellent stabilization was achieved at 100 ppm. of the stabilizer and that significant activity was observed at only 10 ppm.

EXAMPLE II

Aqueous solutions were prepared containing 33.3 g. (10.6% $NaBO_3$) of sodium perborate tetrahydrate, 33.3 g. (17.4% $NaH_2PO_4$) of sodium dihydrogen phosphate monohydrate, and 0.167 g. (1000 ppm.) of various dye additives in 100 g. of tap water. These solutions were maintained at 45° C. in a constant temperature bath for 14 days, and samples then taken for active oxygen analysis by potassium permanganate titration. The stability test results are set forth in Table II. The control value is an average of results in the range of 52.7-57% active oxygen lost.

The tests with Mordant Brown 48, 4 and 24, Acid Red 40 and Acid Violet 7 were repeated using 2000 or 3000 ppm. of the dye. The results were essentially the same as with 1000 ppm. as shown in Table III.

TABLE II

| Stabilizer | % Dye | Color Index No. | Percent Active Oxygen lost @ 14 Days |
|---|---|---|---|
| Mordant Brown 33 | 60 | 13250 | 5.8 |
| Mordant Brown 48 | 20 | 11300 | 5.1 |
| Mordant Brown 4 | 20 | 11335 | 5.45 |
| Mordant Brown 24 | 20 | 11880 | 6.21 |
| Chicago Sky Blue | 50 | 24410 | 5.53 |
| Acid Red 1 | 60 | 18050 | 6.81 |
| Acid Violet 7 | 55 | 18055 | 17.15 |
| Eriochrome Black T | 80 | 14645 | 6.27 |
| Palatine Chrome Black 6BN | 60 | 15705 | 6.14 |
| Calmagite [3-hydroxy-4-(2-hydroxy-5-methylphenylazo)-1-naphthalene-sulfonic acid] | | | 4.68 |
| SNAZOXS | | 30,190-6* | 10.28 |
| Chromotrope 28 | | 16575 | 7.69 |
| Mordant Red 19 | 65 | 18735 | 5.24 |
| Eriochrome Blue Black B | 60 | 14640 | 6.87 |
| Calcon | | | 5.8 |
| Magon | | | 5.63 |
| Disodium 6-(8'-hydroxy-5'sulfo-7-quinolinylazo)naphthalene-2-sulfonate | | | 5.4 |
| Chromotrope 2R | 75 | 16570 | 6.53 |
| Chlorazol Black E | | | 7.0 |
| Acid Red 40 | 40 | 18070 | 9.91 |
| 4-(2-pyridylazo)resorcinol, Na salt, hydrate | | | 22.2 |
| Acid Red 8 | 40 | 14900 | 41.35 |
| Acid Red 114 | 45 | 23635 | 39.96 |
| Sodium 3-(2-Amino-4',6'dihydroxy-5-pyrimidylazo)-4-hydroxy-benzenesulfonate | | | 5.90 |
| Bordeaux R | 70 | 16180 | 50.71 |
| Evans Blue | 85 | 23860 | 36.13 |
| Sodium 2,2',4'-trihydroxyazo-benzene-5-sulfonate | | | 26.13 |
| Trypan Blue | 60 | 23850 | 23.9 |
| Control | 0 | — | 55 |

*Aldrich Catalog Number

TABLE III

| Stabilizer | Amount | Percent Active Oxygen lost @ 14 Days |
|---|---|---|
| Mordant Brown 48 | 3000 ppm. | 5.64 |
| Mordant Brown 4 | 3000 ppm. | 5.33 |
| Mordant Brown 24 | 3000 ppm. | 6.69 |
| Acid Red 40 | 2000 ppm. | 8.35 |
| Acid Violet 7 | 2000 ppm. | 11.84 |
| Control | 0 | 52.7 |

EXAMPLE III

The procedure of Example II was followed in another series of tests with additional stabilizers using a different tap water. The results are presented in Table IV.

TABLE IV

| Stabilizer | % Dye | Color Index No. | Percent Active Oxygen lost @ 14 Days |
|---|---|---|---|
| Mordant Brown 6 | 20 | 11875 | 9.6 |
| Plasmocorinth B | 80 | 16680 | 9.4 |
| Reactive Black 5 | 55 | 30,645-2* | 14.1 |
| Acid Alizarin Violet N | 60 | 15670 | 9.2 |
| Calcon Carboxylic Acid | 60 | 13,079-7* | 22.74 |
| Reactive Orange 16 | 50 | 17757 | 16.0 |
| Mordant Blue 9 | 50 | 14855 | 8.8 |
| SPADNS | — | 11,475-8* | 17.2 |
| Direct Blue 71 | 20 | 34140 | 47.59 |
| Direct Red 23 | 30 | 29160 | 34.46 |
| Xylidyl Blue 1 | — | 24,826-6* | 49.9 |
| Orange II | 90 | 15510 | 60.4 |
| Mordant Brown 1 | 40 | 20110 | 9.2 |
| Tartrazine | 60 | 19140 | 10.1 |
| Control | 0 | — | 99 |

*Aldrich Catalog Number

EXAMPLE IV

Another series of tests was carried out with a tap water with a different hardness, following the procedure of Example II. The results are presented in Table V.

TABLE V

| Stabilizer | % Dye | Color Index No. | Percent Active Oxygen lost @ 14 Days |
|---|---|---|---|
| Acid Red | 40 | 22890 | 22.38 |
| Crocein Orange G | 85 | 15970 | 22.66 |
| Amaranth | 95 | 16185 | 24.17 |
| Sodium 2,4'-dihydroxyazo-benzene-5-sulfonate | — | — | 14.9 |
| Calcomine Orange 2RS | 40 | 29156 | 14.86 |
| Ponceau S | 75 | 14,119-4* | 14.53 |
| Acid Red 73 | — | 27290 | 30.03 |
| 2,2'-dihydroxyazobenzene | — | — | 23.81 |
| Bromosulfonazo III | — | 23,232-7* | 18.3 |
| Acid Violet 5 | 50 | 18125 | 20.0 |
| Calcichrome | — | — | 32.85 |
| 4-(2-pyridylazo)resorcinol | | | 8.70 |
| 4-(4-nitrophenylazo)orcinol | | | 31.03 |
| Control | 0 | — | 46 |

*Aldrich Catalog Number

EXAMPLE V

A further series of tests was carried out using the azo stabilizers and a different tap water, following the procedure of Example II. The results are presented in Table VI.

TABLE VI

| Stabilizer | % Dye | Color Index No. | Percent Active Oxygen lost @ 14 Days |
|---|---|---|---|
| Acid Red 151 | 40 | 26900 | 62.74 |
| New Coccine | 75 | 16255 | 50.36 |
| Acid Red 106 | 50 | 18110 | 58.31 |
| Xylidine Ponceau 2R | 70 | 16150 | 38.32 |
| Crystal Scarlet | 80 | 16250 | 38.10 |
| Control | 0 | | 69.9 |

*Aldrich Catalog Number

EXAMPLE VI

To 90 g. of deionized water containing 12.5 g. of 86% phosphoric acid was added 20.0 g. of sodium percarbonate ($2Na_2CO_3 \cdot 3H_2O_2$; 85%) in portions. The pH was adjusted to 6.2 using an additional 5.5 g. of acid. To a second identical solution was added 0.15 g. (1000 ppm) of Calmagite. The active oxygen content (initially 1.75%) of both solutions was followed at 45° C. by titration with potassium permanganate. The control solution showed 42.1% loss of active oxygen at 7 days and 62.8% loss at 14 days, while the solution containing the azo dye stabilizer lost 18.0% at 7 and 25.2% at 14 days.

EXAMPLE VII

Three solutions were prepared by dissolving 36.74 g. of sodium hydrogen (+) tartrate and 33.33 g. of sodium perborate tetrahydrate in 97 g. of tap water to give 17.7% $NaBO_3$ and 22.0% sodium hydrogen (+) tartrate. To each of two solutions was added 500 ppm. of Calmagite and Mordant Brown 33, respectively, as a stabilizer. The solutions were maintained at 45° C. and the active oxygen content was determined by permanganate titration for each of the solutions after 7 and 14 days. The oxygen lost as a percentage of the initial value was calculated. The results are shown in Table VII.

TABLE VII

Stability of PBS4/Na,H(+) Tartrate Solutions

| | Percent Active Oxygen Lost Days | |
|---|---|---|
| Stabilizer | 7 | 14 |
| Calgamite | 71.92 | 86.85 |
| Mordant Brown 33 | 53.08 | 84.45 |
| Control | 87.91 | 99.38 |

EXAMPLE VIII

Three test solutions were prepared by dissolving 25.05 g. of sodium titrate and 49.27 g. of sodium perborate tetrahydrate in 92.6 g. of tap water to give 26.2% NaBO= and 15.0% sodium citrate. To each of two solutions was added 500 ppm. of Calmagite and Mordant Brown 33, respectively, as a stabilizer. The solutions were maintained at 45° C. and the active oxygen content was determined by permanganate titration for each of the solutions after 7 and 14 days. The oxygen lost as a percentage of the initial value was calculated. The results are shown in Table VIII.

TABLE VIII

Stability of PBS4/Sodium Citrate Solutions

| | Percent Active Oxygen Lost Days | |
|---|---|---|
| Stabilizer | 7 | 14 |
| Calgamite | 17.83 | 36.63 |
| Mordant Brown 33 | 17.66 | 46.60 |
| Control | 83.17 | 95.11 |

EXAMPLE IX

A series of solutions was prepared using 30.0 g. of sodium perborate tetrahydrate, 11.50 g. of 87% phosphoric acid, 8.35 g. (active basis) of surfactant, 0 or 0.42 g. of azo stabilizer, and sufficient milli-Q water to give a total solution weight of 167.0 g. These solutions were maintained in a constant temperature bath at 45° C. and the active oxygen content determined after 7 and 14 days by titration of an aliquat in strong acid solution with standard $KMnO_4$ solution. The percentage of the original active oxygen lost was calculated and are shown in Table IX.

TABLE IX

| | Stabilizer (ppm) | | % Act. O Lost/45° C. | |
|---|---|---|---|---|
| Surfactant | MB33[a] | CSB[b] | 7 days | 14 days |
| None | 0 | 0 | 6.60 | 15.9 |
| Mafo CAB[c] | 0 | 0 | 11.6 | 26.1 |
| Mafo CAB[c] | 250 | 0 | 6.84 | 16.1 |
| Lonzaine CS[d] | 0 | 0 | 11.0 | 23.9 |
| Lonzaine CS[d] | 0 | 250 | 8.62 | 16.7 |
| Barlox c[e] | 0 | 0 | 7.08 | 16.5 |
| Barlox c[e] | 0 | 250 | 4.74 | 10.4 |
| Dowfax 2A1[f] | 0 | 0 | 16.3 | 29.4 |
| Dowfax 2A1[f] | 0 | 250 | 9.21 | 21.6 |

[a]Mordant Brown 33
[b]Chicago Sky Blue
[c]Cocoamide betaine
[d]Cocoamido sultaine
[e]Cocoamido amine oxide
[f]Sodium dodecyl diphenyloxide disulfonate The results show that the azo compounds stabilize solutions containing these four classes of surfactants.

EXAMPLE X

A second series was run as in Example IX using a different group of surfactants. The results are given in Table X.

TABLE X

| Surfactant | Stabilizer (ppm) | | % Act. O Lost/45° C. | |
|---|---|---|---|---|
| | MB33[a] | CSB[b] | 7 days | 14 days |
| None | 0 | 0 | 4.71 | 10.5 |
| Sipon ES[c] | 0 | 0 | 7.60 | 17.0 |
| Sipon ES[c] | 0 | 250 | 4.34 | 9.01 |
| Sipon L-22[d] | 0 | 0 | 5.74 | 12.9 |
| Sipon L-22[d] | 250 | 0 | 3.14 | 6.56 |
| Ammonyx MD[e] | 0 | 0 | 6.31 | 14.7 |
| Ammonyx MD[e] | 250 | 0 | 3.72 | 7.39 |

[a]Mordant Brown 33
[b]Chicago Sky Blue
[c]Sodium lauryl ether sulfate
[d]Ammonium salt of lauryl sulfate
[e]Myristyl dimethyl amine oxide These results show that perborate/phosphate solutions containing these three types of surfactant are stabilized by the stabilizers of this invention.

Various modifications and changes to the invention can be made and, to the extent that such variations incorporate the spirit of this invention, they are intended to be included within the scope of the appended claims.

What is claimed is:

1. A stable, concentrated aqueous persalt bleach solution having a pH of a persalt selected from the group consisting of about 5 to 8 comprising about 5 to 30% of sodium perborate and sodium percarbonate, about 3 to 30% solubilizing agent, about 0.001 to 1.0% of an azo stabilizing agent selected to be tartrazine, and the balance of said solution is water, wherein all percentages are by weight.

2. An aqueous solution in accordance with claim 1 in which said solubilizing agent is sodium dihydrogen phosphate.

3. An aqueous solution in accordance with claim 1 in which said solubilizing agent is boric acid.

4. The solution according to claim 1 in which said persalt is about 8 to 25% by weight sodium perborate.

5. An aqueous solution in accordance with claim 1 containing up to about 5% by weight of a chelating agent.

6. An aqueous solution in accordance with claim 5 in which said chelating agent is pentasodium diethylenetriamine penta(methylene phosphonate).

7. In the method of stabilizing an aqueous bleach solution comprising about 5 to 30% by weight of a persalt selected from the group consisting of sodium perborate sodium percarbonate and, about 2 to 30% by weight of a solubilizing agent and having a pH of about 5-8, the improvement which comprises adding to said solution about 0.001 to 1.0%, by weight, of an azo stabilizing agent selected to be tartrazine.

8. The method according to claim 7 in which said bleach solution contains about 8 to 25% by weight of sodium perborate.

9. The method according to claim 7 in which said bleach solution contains about 5 to 20% by weight of a sodium hydrogen phosphate solubilizing agent.

10. The method according to claim 7 in which said bleach solution contains about 5% by weight of a chelating agent.

11. The method according to claim 10 in which said chelating agent is pentasodium diethylenetriamine penta (methylene phosphonate).

* * * * *